E. J. CALDWELL.

GAS-STOVE.

No. 7,077. Reissued April 25, 1876.

*Witnesses:*

Ewell & Pack

Jas. Q. Patten

*Inventor:*

Alanson H. Tifft assignee of E. J. Caldwell by atty.

Pollok & Bailey

N. PETERS, PHOTO-LITHOGRAPHER, WASHINGTON, D. C.

UNITED STATES PATENT OFFICE.

ELIJAH J. CALDWELL, OF NEW YORK, N. Y., ASSIGNOR, BY MESNE ASSIGNMENTS, TO ALANSON H. TIFFT.

IMPROVEMENT IN GAS-STOVES.

Specification forming part of Letters Patent No. 49,469, dated August 15, 1865; reissue No. 7,077, dated April 25, 1876; application filed April 15, 1876.

*To all whom it may concern:*

Be it known that ELIJAH J. CALDWELL, of the city, county, and State of New York, has invented certain new and useful Improvements in Gas-Stoves, of which the following is a full, clear, and exact description, reference being had to the accompanying drawings, figures, and letters of reference, making part of this specification.

The invention consists, primarily, of the combination, in a burner for gas-stoves, of a perforated diaphragm, through which the air and gas pass, an annular outlet, through which the mixture of air and gas passes, so arranged that the gas, when ignited, will form, in effect, a continuous sheet of flame, and a chamber intermediate between the diaphragm and the outlet.

It also consists in the combination of the foregoing elements with a flanged top—that is to say, a top having a circumferential flange extending laterally over and beyond the gas-outlet, substantially as and for the purposes hereinafter stated.

The accompanying drawing represents a stove embodying the improvements above named.

Figure 2:
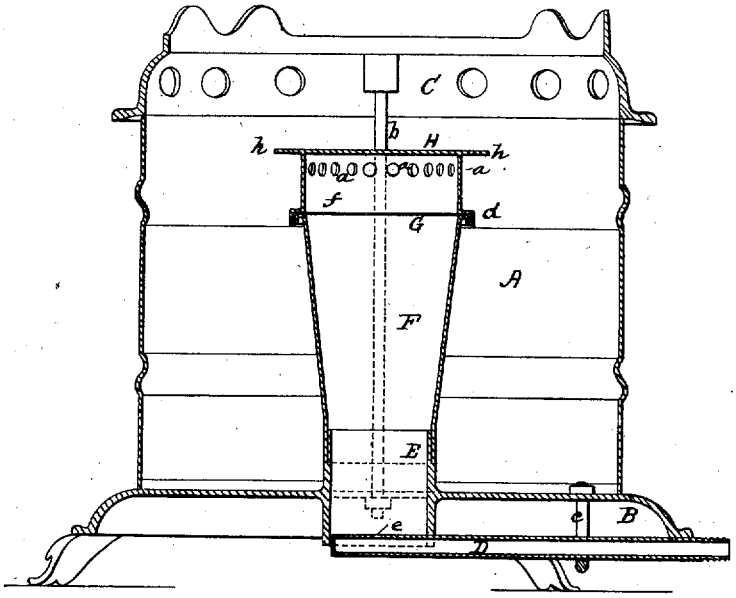
Figure 2:
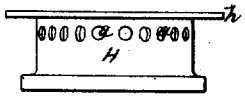
Figure 3:
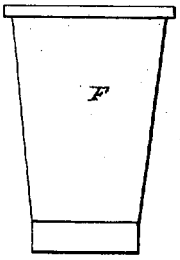
Figure 4:
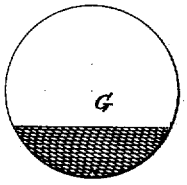
Figure 1:
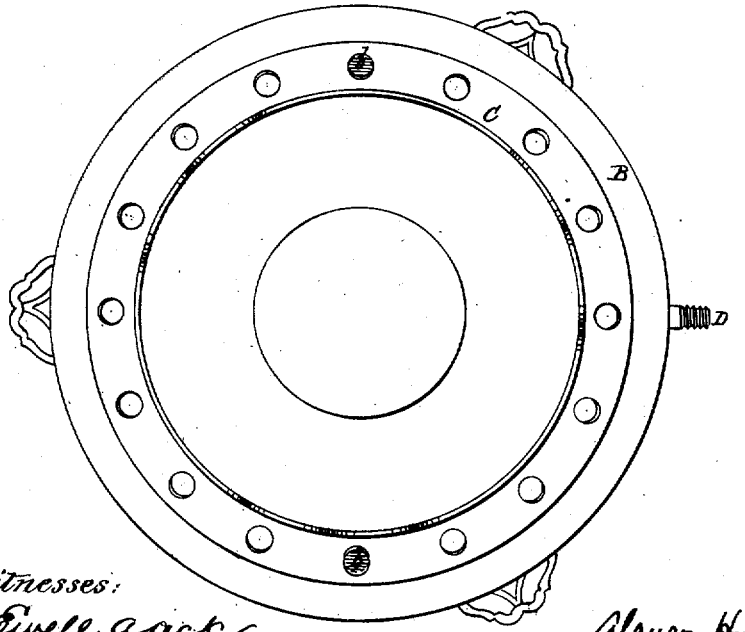

Figure 1 is a top view of the gas-stove. Fig. 2 is a vertical section, and Figs. 3 and 4 show parts in detail.

A represents the cylinder of a stove, made of sheet iron, fitted to a perforated cast-iron base, B, and surmounted by a cast top, C, the whole being secured together by bolts *b b*. In the center of the base B is cast a cylinder, E, open at the bottom for the admission of air, which projects upward, and upon which the tube F is connected by a friction-joint. To the bottom of the cast bed is secured the supply-pipe D, by means of a bolt, *c*, which pipe has a small hole, *e*, for the gas to pass up the cylinder F. In this tube F is suitably secured—as, for instance, by a friction-joint, *d*—a fine-wire sieve or perforated diaphragm, G, through which the air and gas pass. Above the perforated diaphragm is a cap, H, which, in conjunction with the cylinder F, forms the joint *d* aforesaid. In the sides of the cap is the gas-outlet, consisting of a series of perforations, *a*, forming an annulus around the burner, through which the inflammable material, when ignited, issues, so as to form a continuous sheet of flame. Under this arrangement there is formed an intermediate chamber, *f*, between the perforated diaphragm and the gas-outlet. Around the top of the cap is a flange, *h*, provided for the protection of the gas-outlet.

The operation will be as follows: Gas, being communicated by a rubber tube or suitable pipe, will pass through the pipe D and up the cylinder F, and, as the bottom of the tube is open, a current of air passes up and is freely mixed with the gas. The mixture of air and gas, after passing through the perforated diaphragm, enters the intermediate chamber and thence escapes through the perforations *a a*, where it is ignited, and passes up around the flange *h* in a continuous sheet of flame, giving out a steady powerful heat.

The flanged cap H serves a twofold purpurpose, acting as a radiator, and also to prevent any accumulation of dirt or passage of boiling water upon the sieve, which is liable to occur where the cylinder is open at the top.

The perforated diaphragm effectually checks and prevents any downward blowing of the gas when it is turned down, and produces a thorough intermingling of the air and gas.

What is claimed as the invention of ELIJAH J. CALDWELL is as follows:

1. The combination of the annular outlet through which the inflammable material passes from the burner, the perforated diaphragm through which the air and gas pass and become thoroughly mixed, and the chamber intermediate between the diaphragm and the outlet, substantially as described.

2. In a burner for gas-stoves, the combination of the following elements, namely, an air-cylinder, a gas-supply pipe, a perforated diaphragm, a cap above the diaphragm, an annular outlet below the top of the cap for escape of the inflammable material, the combination being and acting substantially as set forth.

3. The combination, with the horizontal perforated diaphragm, of the cap provided with an annulus of lateral perforations or openings for escape of the inflammable material, substantially as set forth.

4. The combination, with a burner, substantially such as described, of a laterally-projecting flange, overhanging and protecting the gas-outlet and the perforated diaphragm, substantially as set forth.

In testimony whereof I have hereunto signed my name this 11th day of April, A. D. 1875.

ALANSON H. TIFFT.

Witnesses:
A. POLLOK,
EWELL A. DICK.